United States Patent [19]
Glemet et al.

[11] Patent Number: 4,957,422
[45] Date of Patent: Sep. 18, 1990

[54] APPARATUS FOR THE MANUFACTURE OF SECTIONS OF THERMOPLASTIC RESIN REINFORCED WITH CONTINUOUS FIBERS

[75] Inventors: Michel Glemet, Serguigny; Gilles Cognet, Bernay, both of France

[73] Assignee: Societe Atochem, Puteaus, France

[21] Appl. No.: 405,551

[22] Filed: Sep. 11, 1989

Related U.S. Application Data

[62] Division of Ser. No. 176,854, Apr. 4, 1988, Pat. No. 4,883,625.

[30] Foreign Application Priority Data

Apr. 9, 1987 [FR]  France ................................ 87 04996

[51] Int. Cl.⁵ ............................................. B29C 47/02
[52] U.S. Cl. .................................. 425/114; 425/382.4; 425/461
[58] Field of Search ..................... 425/113, 114, 378.1, 425/382.4, 461, 467; 264/136, 174

[56] References Cited

U.S. PATENT DOCUMENTS

| | | | |
|---|---|---|---|
| 3,993,726 | 11/1976 | Moyer | 264/174 |
| 4,312,917 | 1/1982 | Hawley | 428/375 |
| 4,588,538 | 5/1986 | Chung et al. | 264/29.2 |

Primary Examiner—James C. Housel
Attorney, Agent, or Firm—Burgess, Ryan & Wayne

[57] ABSTRACT

An apparatus for the manufacture of sections of thermoplastic resin reinforced with continuous fibers. The apparatus includes coating rovings, having their fibers previously arranged in the form of a sheet by passage through a baffle zone having at least one transverse baffle, in a coating zone fed with a molten thermoplastic, then, to ensure impregnation of each of the fibers of the rovings, the coated rovings are passed into a forced impregnation zone having at least two baffles parallel to the baffle in the baffle zone prior to passing into the channel for shaping the final product.

3 Claims, 3 Drawing Sheets

APPARATUS FOR THE MANUFACTURE OF SECTIONS OF THERMOPLASTIC RESIN REINFORCED WITH CONTINUOUS FIBERS

This is a division of application Ser. No. 176,854, filed Apr. 4, 1988 now U.S. Pat. No. 4,883,625.

BACKGROUND OF THE INVENTION

This invention concerns a process for the manufacture of sections of thermoplastic resin reinforced with continuous fibers and the equipment for producing such a product. The process comprises coating rovings that have the fibers that constitute them arranged in the form of a sheet prior to passing into the coating zone, then, in order to ensure impregnation of the fibers of the rovings, passing the aggregate into a forced impregnation zone prior to passing to the channel for shaping the final product The coating zone is fed in a known manner by at least one extruder.

It is known, for example, from U.S. Pat. No. 3,834,980 to coat rovings with thermoplastic resin. According to the known methods of coating, the rovings are passed through the central heated body of a coating head, the coating being effected by means of a supply of molten thermoplastic resin from the known system.

A roving comprises the combination of several continuous elementary fibers.

In the known methods of coating for the manufacture of thermoplastic sections reinforced with continuous fibers, several rovings are generally combined in the form of a bobbin. In this method, there are two major problems that have not been solved. The first consists in the difficulty of thoroughly impregnating the bobbins and homogenously distributing the thermoplastic resin around each one of the elementary fibers. The second, which is a consequence of the first, is to eliminate from the finished product, air trapped between the fibers which impairs the mechanical properties of the finished product.

In U.S. Pat. No. 3,993,726, it is possible to impregnate a roving separately by placing in the impregnation zone, two series of baffles arranged substantially perpendicular in relation to each other In this manner, the roving is expanded and impregnated in one direction and then flattened in an opposite direction in the second series of baffles. This device has a two-fold disadvantage. First, the arrangement is useful for the impregnation of a single roving; due to the arrangement of the baffles, it is not possible to impregnate individual fibers of rovings in sheet form since a sheet cannot undergo a rotation of about 90° in a channel full of plastic material without the fibers gathering in a mass. The second inconvenience results from the arrangement of the baffles in the equipment; all the baffles are arranged in the channel which causes a double flattening of the roving directly in the molten plastic material and, therefore, requires considerable tension force on the fibers at the exit of the channel which results in breakage of the fibers. Under these conditions, the quality of impregnation of the fibers is not good; the flexural characteristics obtained in the finished product are low. The effectiveness of the reinforcement characterized by the $\epsilon$ coefficient is low, and generally does not exceed 0.25.

U.S. Pat. No. 4,312,917 describes a process for coating individual rovings in a channel filled with molten plastic material. The process has the disadvantages of the process of U.S. Pat. No. 3,993,726, and adds another problem, in that the rovings brought from the outside are introduced in the coating channel substantially perpendicular to the axis of the channel which creates additional rupturing stresses and an entanglement of the fibers starting from the second baffle because the cold rovings carry a solidified layer of the impregnating resin on their surface.

SUMMARY OF THE INVENTION

In the process according to the invention, the rovings are expanded so that individual fibers of the roving are arranged, substantially side-by-side, before entering the coating zone. The rovings in this case are in the form of a sheet or strip comprising a succession of parallel continuous individual fibers. In order to effect this alignment of the fibers by expanding the roving, the rovings are introduced in the coating zone fed with molten thermoplastic polymer after having passed through at least one baffle of a first baffle zone which, by exerting force on the roving, produces the spreading of the fibers. The sheet or strip thus formed is then coated with thermoplastic resin and passed through, before passing to the shaping zone, an impregnating zone formed by baffles substantially parallel with that or those of the first baffle zone. In this system, the roving sheet or strip coated with molten thermoplastic resin passes into an impregnating zone comprising a series of at least two baffles parallel with each other, which contact opposite surfaces of the coated sheet of roving. In the impregnation zone, the aggregate of fibers coated with thermoplastic resin is flattened by contact with the first baffle by one of its surfaces, forcing the resin to penetrate in a molten state between the fibers in order to pass toward the opposite surface. The opposite effect is produced when the coated strip of fibers contacts the second baffle with its opposite surface. The system of baffles before and after the coating of the sheet or strip causes the impregnation of the individual fibers which produces a more uniform distribution of the resin in the fibers and almost total elimination of air occluded in the rovings This method makes it possible to expand the fibers of the rovings in the first zone of baffles by aligning them in parallel to form a sheet of fibers. These fibers that have been aligned reach the coating zone substantially separated from each other which permits coating of the individual fibers without danger of breakage before passing into the second zone of baffles (impregnation zone). The baffles prevent the strip or sheet from passing straight through the apparatus and cause it to take a tortuous path.

DETAILED DESCRIPTION OF THE INVENTION

The present invention is best illustrated by reference to the drawings.

Figure 1:
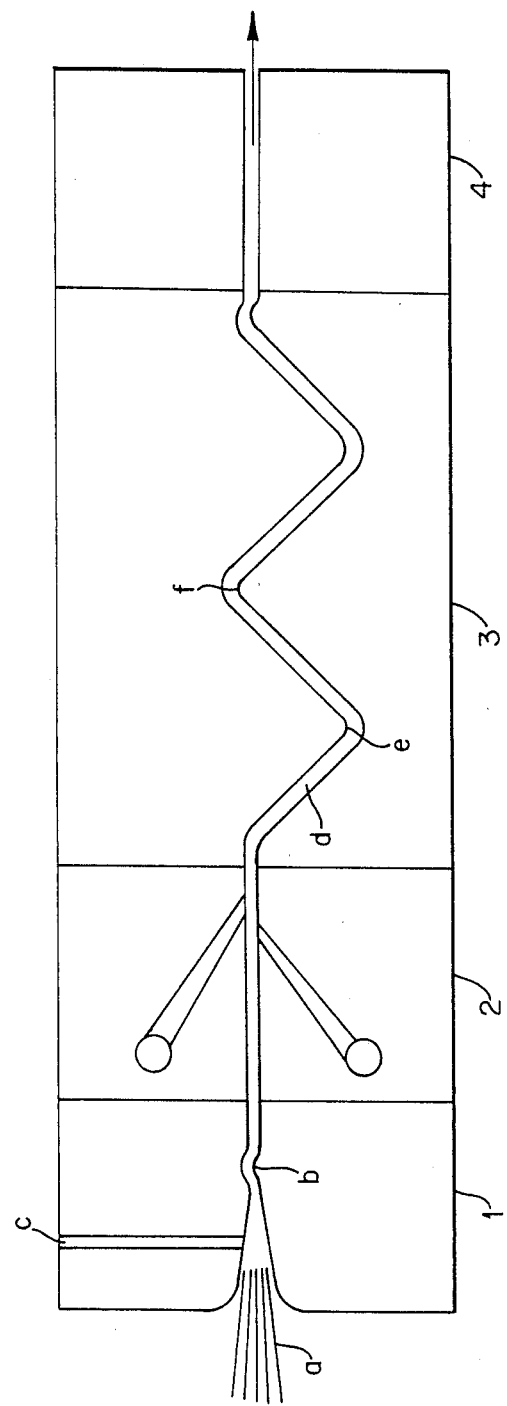
FIG. 1 is a diagrammatic representation of an embodiment of an apparatus to carry out the process of the invention.

The apparatus comprises in Section 1, a means for expanding the rovings so that the individual fibers lie substantially side-by-side. In FIG. 1, Section 1 comprises a system of baffles that causes spreading of the fibers of the rovings. In Section 2, there follows the coating zone connected to an extruder not shown and preceding the system of baffles of Section 3 for causing impregnation of the fibers. Section 4 comprises a shaping means for forming the impregnated rovings into the desired shape.

Section 1 is the spreading means comprised of a channel into which the rovings "a" are drawn. This channel may be of any desired geometry but is preferably of rectangular section so as to facilitate forming the rovings into a sheet or strip. The inlet of the channel can be flared so as to permit easy entrance of the rovings into the apparatus. The channel comprises at least one baffle "b" that changes the direction of drawing of the rovings. This baffle is situated substantially perpendicular to the axis of drawing of the rovings, and of the channel. The baffle is arranged so that while the rovings are passing through the channel, they contact the baffle in a manner which causes the flattening of the fibers that constitute each roving. A single baffle is generally sufficient, but in case it is desired to form a sheet from numerous rovings, it can be useful to provide a system comprising several baffles in series. In order to improve the subsequent impregnation of the fibers, it can be useful to provide a vacuum means "c" to eliminate air occluded in the rovings. A heating system in Section 1 is useful and preferred.

The coating zone Section 2 is of the type generally known for coating continuous fibers with a molten polymer. The coating zone can comprise a channel fed with molten thermoplastic resin that coats the fibers.

The Section 3 of the apparatus forms the impregnating zone and comprises a second system of baffles in the channel The channel is preferably heated to a temperature at least equal to that of the melting point of the thermoplastic resin. The impregnation zone comprises a channel "d" in the alignment with the channel of the coating zone which receives the fibers coated with molten thermoplastic resin. The channel includes at least two baffles "e" and "f" arranged substantially perpendicular to its axis and also to the axis of drawing of the coated fibers The baffles "e" and "f" are arranged so that opposite surfaces of the coated sheet or strip of roving alternately contact the baffles to force the coating into and through the roving. Two additional baffles (unnumbered) are shown in Section 3 of FIG. 1. As already explained, these baffles are substantially parallel with the baffle "b".

Figure 2:
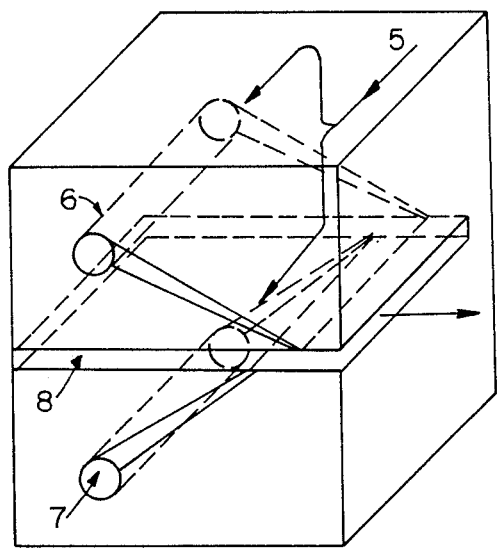
FIG. 2 is a diagrammatic representation of the coating zone of the apparatus of FIG. 1.

The impregnated fibers are cooled at the exit of the apparatus after having passed into the shaping zone 4. The shaping zone, which is customary is any extrusion system, imparts the final appearance to the product produced. According to known methods, it is possible, taking into consideration the geometry of the shaping channel, to obtain sophisticated sections or single shapes that are cut into small pieces to form granules. The granules can be subsequently shaped by any shaping method FIG. 2 shows a section of the portion 2 of FIG. 1, relative to the coating zone. The figure illustrates a known coating means that coats the fibers of rovings arranged as a sheet. An extruder 5, not shown, supplies molten thermoplastic resin, by means of feed channels 6 and 7, to channel 8, shown with a rectangular cross-section through which the sheet of fibers is drawn. The arrangement of the feed channels 6 and 7 is such that it distributes molten thermoplastic resin on at least the two largest opposite faces of the sheet of fibers.

Figure 3:
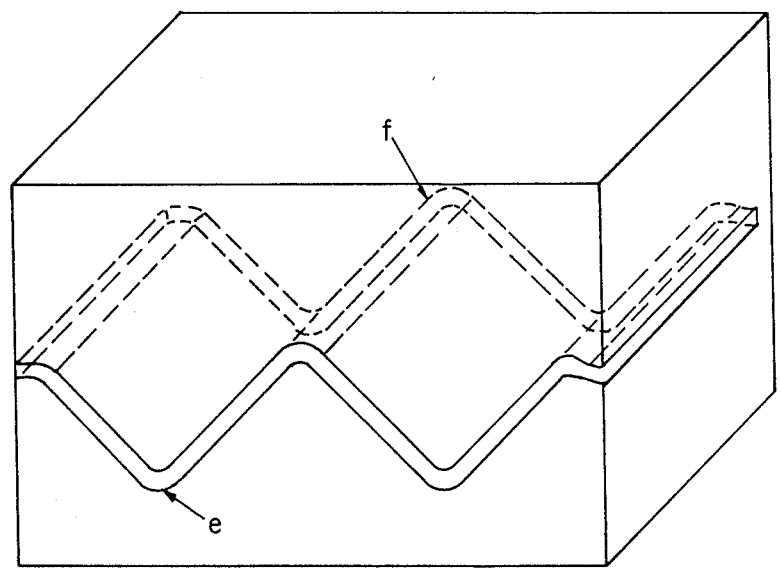
FIG. 3 is an illustration of a baffle arrangement of an impregnation zone of the embodiment of the invention of FIG. 1.

FIG. 3 is a cross-section of Section 3 that forms the impregnation zone comprising a system of baffles. According to this figure, particularly useful in the invention, the baffles result from the very shape of the channel that sinusoidally meanders between the exit of the coating zone and the shaping zone. The system, as illustrated, comprises a metal block, preferably heated, traversed by a channel in the shape of a sinusoidal coil having at least two parallel baffles opposite to each other which are represented by a high crest "f" and a low crest "e" of the sinusoid. Two additional baffles are shown, but are not numbered. The channel, as illustrated, has a small height in relation to its width.

Figure 4:
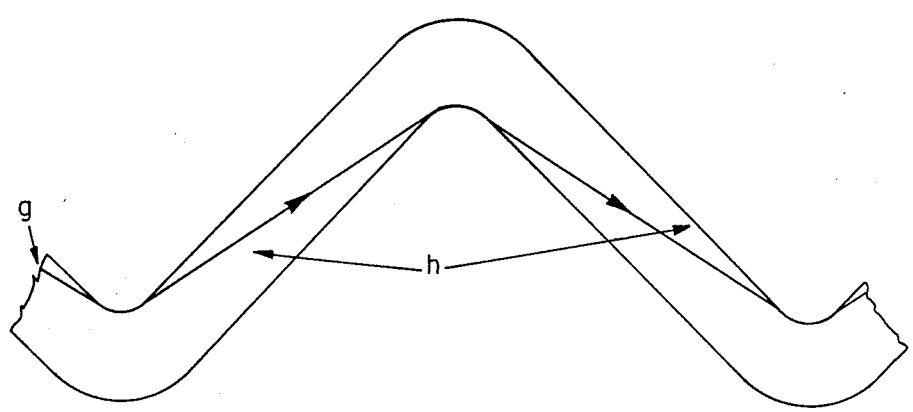
FIG. 4 is a cross-section of the channel of FIG. 3, illustrating the path of the coated strip and contact of opposite surfaces with the baffles in the impregnation zone.

FIG. 4 makes it possible to understand how, in a system of baffled channels according to FIG. 3, the aligned fibers "g" of the rovings that contact the crests of the sinusoid channel force the molten thermoplastic resin "h" to pass therebetween and consequently, to improve the impregnation and coating of the rovings.

The process according to the invention produces thermoplastic sections or articles reinforced with continuous fibers. Any extrudable thermoplastic polymer or copolymer, can be used in the present process Useful polymers include polyolefins, such as polyethylene or polypropylene, vinyl aromatic polymers and copolymers thereof, such as polystyrene and the acrylonitrile-butadiene-styrene copolymers, halogenated vinyl polymers, such as polyvinylchloride and vinylidene polyfluoride, polyamides, such as polyamides 6, 11, 12, 6-6, 6-10, polyesters such as polyethylene terphthalate, polybutylene terephthalate, sequenced poly-(ether-amide) copolymers, polysulfones, polyethersulfones, polycarbonates, polyetherether ketones, polyphenylene sulfides, polyetherimides, polyphenylene oxides, polyphenylene ethers, and mixtures thereof.

The extrudable thermoplastic polymers can be reinforced with mineral or organic continuous fibers. By way of example, there can be cited rovings of fiber glass, silica, carbon, or of aramide.

The reinforces articles or sections produced can be in the form of useful shapes. The article can be in the form of granules, and used as an intermediate product in injection, compression, injection-compression, extrusion and other methods for producing shaped reinforced thermoplastic articles.

Generally, at least the coating and impregnation zones are heated to prevent solidification of the thermoplastic resin. The Section 1 for spreading the fibers into a sheet is preferably heated to prevent the cold fibers from being coated with a layer of solidified resin. The temperature of the apparatus is dependent upon the melting point and other properties of the thermoplastic resin which is utilized. Generally, the temperature is adjusted to maintain the thermoplastic resin at a temperature between the melting point and the decomposition temperature. Cooling means are generally provided at the outlet of the shaping zone so that a solid shaped article leaves the apparatus.

The following examples illustrate the invention, without limiting it.

EXAMPLE 1

There is used an apparatus according to FIG. 1, having the following specifications:

| Section 1 - First Baffle Zone | |
| --- | --- |
| length | 60 mm |
| width | 100 mm |
| channel depth | 3 mm |
| flared inlet and a baffle with a dome height | 10 mm |
| Section 2 - Coating Zone | |
| length | 90 mm |
| width | 100 mm |
| two feed channels with a diameter | 10 mm |
| channel depth at exit of zone | 3 mm |
| thermoplastic feed extruder with a diameter | 30 mm |
| length of thread | 22 D |
| Section 3 - Impregnating Zone | |
| length | 200 mm |
| width | 100 mm |
| sinusoidal channel with 3 baffle crests | |
| length between crests | 40 mm |
| channel depth | 3 mm |
| Section 4 - Shaping Zone | |
| drawplate having 5 holes of diameter | 3 mm |
| length | 100 mm |
| width | 100 mm |

There were manufactured in this apparatus, strips of polyamide 11 with a 50% charge of fiberglass E, Roving 2400 tex.

The speed of drawing was 3 meters per minute.
The temperature of each one of the sections is:
Section 1: 200° C.
Section 2: 230° C.
Section 3: 230° C.
Section 4: 210° C.

EXAMPLE 2

In the apparatus of Example 1, with the exception of the shaping Section 4 that has the following characteristics, followed by a cooled shaping zone:
Rectangular inlet section 100 mm wide by 3 mm deep,
Rectangular outlet section 10 mm wide by 3.5 mm deep,
Length 100 mm, and
there was manufactured a bar 10 mm wide by 3.5 mm thick formed of polyamide 5 with a 39.3% by volume charge of fiberglass E, Roving 2400 tex.

The speed of drawing was 3 meters per minute.
The temperature of each of the sections is:
Section 1: 220° C.
Section 2: 280° C.
Section 3: 280° C.
Section 4: 260° C.
The flexural modulus of the bar was 24500 MPa.
The coefficient $\epsilon = 0.85$
The coefficient $\epsilon$ was obtained from the law of mixtures:

$$E = \epsilon E_f V_f + E_m (1 - V_f)$$

wherein
Ef = Young modulus of the fiber,
Em = Young modulus of the matrix,
Vf = Volume fraction of the fibers, and
E = Experimental value of the flexural modulus.

EXAMPLE 3

In the apparatus of Example 1, there were manufactured reeds of polyamide 12 with a 40% charge of masses of fiberglass E, Roving 2400 tex.

The speed of drawing was 3 meters per minute.
The temperature of each one of the sections was:
Section 1: 220° C.
Section 2: 260° C.
Section 3: 260° C.
Section 4: 240° C.

EXAMPLE 4

In the equipment of Example 2, there were manufactured polypropylene bars containing 3% propylene grafted with maleic anhydride with a 28% charge by volume of fiberglass E, Roving 2400 tex.

The speed of drawing was 3 meters per minute.
The temperature of each one of the sections was:
Section 1: 240° C.
Section 2: 260° C.
Section 3: 260° C.
Section 4: 240° C.
The flexural modulus obtained was 15400 MPa.
The $\epsilon$ coefficient = 0.78

EXAMPLE 5

In the equipment of Example 1, but in Zone 4 replacing the drawplate of 5 holes by a drawplate of a single orifice having a length of 200 mm, a width of drawplate exit of 100 mm, and a depth of 0.7 mm, there was manufactured a sheet of polyamide 6 with a 40% charge of mass of fiberglass E, Roving 2400 tex.

The speed of drawing was 1 meter per minute.
The temperature of each of the sections was:
Section 1: 220° C.
Section 2: 280° C.
Section 3: 280° C.
Section 4: 275° C.

We claim:
1. An apparatus for the manufacture of articles of thermoplastic resin reinforced with continuous fibers which comprises a channel including a coating zone having means for coating the continuous fibers and a shaping zone downstream of said coating zone and having means for shaping the articles, wherein a baffle zone is provided upstream of and in communication with the coating zone, said baffle zone comprising a baffle channel portion and at least one baffle extending substantially transversely into said baffle channel portion; and between the coating zone and the shaping zone, there is an impregnation zone in alignment with the exit of the coating zone and the entrance of the shaping zone, and having at least two baffles opposite to, and parallel with, each other, and extending substantially transversely into the channel; wherein the at least one baffle of the first baffle zone is substantially parallel to the at least two baffles of the impregnating zone.

2. An apparatus of claim 1, wherein the impregnation zone is formed by a metal block provided with a sinusoidal channel portion having at least two parallel baffles opposite to each other represented by a high crest and a low crest of the channel.

3. An apparatus of claim 1, wherein the first baffle zone is provided with a heating means for heating said continuous fibers.

* * * * *